US012316967B2

(12) United States Patent
Öztürk

(10) Patent No.: US 12,316,967 B2
(45) Date of Patent: May 27, 2025

(54) MULTI-AXIS CAMERA STABILIZATION SYSTEM AND OPERATION METHOD

(71) Applicant: SÜLEYMAN DEMİREL ÜNİVERSİTESİ İDARİ VE MALİ İŞLER DAİRE BAŞKANLIĞI GENEL SEKRETERLİK, Merkez Isparta (TR)

(72) Inventor: Yasin Öztürk, Merkez Isparta (TR)

(73) Assignee: SÜLEYMAN DEMIREL ÜNIVERSITESI IDARI VE MALI ISLER DAIRE BASKANLIGI GENEL SEKRETERLIK, Merkez Isparta (TR)

( * ) Notice: Subject to any disclaimer, the term of this patent is extended or adjusted under 35 U.S.C. 154(b) by 0 days.

(21) Appl. No.: 18/280,469

(22) PCT Filed: Nov. 28, 2022

(86) PCT No.: PCT/TR2022/051363
§ 371 (c)(1),
(2) Date: Sep. 5, 2023

(87) PCT Pub. No.: WO2023/136794
PCT Pub. Date: Jul. 20, 2023

(65) Prior Publication Data
US 2024/0147070 A1 May 2, 2024

(30) Foreign Application Priority Data
Jan. 11, 2022 (TR) .............................. 2022/000340

(51) Int. Cl.
*H04N 23/68* (2023.01)

(52) U.S. Cl.
CPC ....... *H04N 23/685* (2023.01); *H04N 23/6811* (2023.01)

(58) Field of Classification Search
CPC .. H04N 23/685; H04N 23/6811; H04N 23/68; H04N 23/681; F16M 2200/041;
(Continued)

(56) References Cited

U.S. PATENT DOCUMENTS

2014/0099092 A1\* 4/2014 Di Leo ................. F16M 13/04
396/420
2016/0381271 A1 12/2016 Cheng et al.
(Continued)

FOREIGN PATENT DOCUMENTS

CN         109561187 A      4/2019

OTHER PUBLICATIONS

International Search Report and Written Opinion for PCT/TR2022/051363 completed Apr. 26, 2023.

*Primary Examiner* — Timothy J Henn
(74) *Attorney, Agent, or Firm* — Fresh IP PLC; Clifford D. Hyra; Aubrey Y. Chen

(57) ABSTRACT

Disclosed herein is a multi-axis camera stabilization system and operation method. In particular, the disclosure relates to a multi-axis camera stabilization system which uses the visual-inertial odometry method and works in integration with augmented reality, thereby ensuring that the cameras remain stable during shooting. The disclosure further relates to an operation method for the aforementioned.

7 Claims, 2 Drawing Sheets

(58) Field of Classification Search
CPC .. F16M 2200/047; F16M 11/18; F16M 13/04; G03B 2205/0007; G03B 17/561; G02B 27/64; G02B 7/002
See application file for complete search history.

(56) References Cited

U.S. PATENT DOCUMENTS

| | | | |
|---|---|---|---|
| 2017/0321843 | A1 | 11/2017 | Tian et al. |
| 2018/0335178 | A1* | 11/2018 | Bin ........................ F16M 11/18 |
| 2019/0098191 | A1 | 3/2019 | Enke et al. |
| 2021/0033242 | A1* | 2/2021 | Zhang ................. F16M 11/046 |
| 2023/0211986 | A1* | 7/2023 | Bergez ................... F16M 11/18 |
| | | | 254/122 |
| 2023/0421902 | A1* | 12/2023 | Kang ........................ G06T 5/20 |
| 2024/0095892 | A1* | 3/2024 | Kotoku .............. H04N 23/6812 |
| 2024/0133512 | A1* | 4/2024 | Falcucci ............. F16M 11/048 |

* cited by examiner

MULTI-AXIS CAMERA STABILIZATION SYSTEM AND OPERATION METHOD

TECHNICAL FIELD

In general, the disclosure relates to a multi-axis camera stabilization system that ensures that the cameras remain stable during shooting and the operation method thereof.

In particular, the disclosure relates to a multi-axis camera stabilization system which uses the visual-inertial odometry method and works in integration with augmented reality, which ensures that the cameras remain stable during shooting, and the operation method thereof.

BACKGROUND

Today, steadicam and gimbal systems, which can work independently of the environment, are widely used among moving camera systems to keep the cameras stable during shooting. These systems prevent unwanted movements of the cameras.

Existing steadicam systems have a structure with an increased moment of inertia carried from the centre point in order to keep the camera stable against unwanted rotational movements. However, these are difficult to use and install. They present big difficulties to the operator during use. They also have a restrictive effect due to their weights. In addition, they also comprise a spring-loaded arm mechanism against undesired translation position changes and this arm mechanism partially prevents vertical movements. But it bears difficulties in preventing in slow movements.

In conventional gimbal systems, the installation of the system is relatively simple. With proper balancing, it is possible to successfully prevent unwanted rotational movements. When gimbals are properly balanced, they can effectively prevent unwanted rotational movements, but they cannot prevent undesired up-down, right-left or forward-backward translational position changes.

For these reasons, solutions are needed to prevent undesired position changes of gimbals on the vertical axis caused by walking. Because undesirable up-down camera movements, usually caused by walking, create a subjective situation in situations where there should be an objective shooting/point of view, causing the audience to feel very much in the process.

Spring arm mechanisms can be attached to gimbal systems as in steadicams, but in this case, although the problems are partially reduced, an efficient result cannot be obtained because of the movement and frequency. Involuntary position changes occur, especially in certain repetitive movements such as walking. It is almost impossible to prevent movements that do not change at certain frequencies with spring systems.

There are also examples where gimbals are mounted on steadicams. However, the problems that come with the weight of steadicams in these solutions still continue.

For example, in the prior art document numbered TR 2016/03364, a camera stabilization system is described. This invention relates to the camera stabilization system (gimbal), consisting of battery (1), yaw position feedback sensor (yaw encoder) (5) (2.1), pitch position feedback sensor (pitch encoder) (2.2), roll position feedback sensor (roll encoder) (2.3), controller chamber (3), yaw motor (4.1), roll motor (4.2), pitch motor (4.3), camera link module (5), carbon fibre handle (6), quick release switch (7), carrier main body (8), on/off button (9), camera sensor (10.1), the case sensor (10.2) and Bluetooth module (11) parts. However, in said invention, measurement with odometry and augmented reality is not mentioned, and undesired translational position changes cannot be prevented with said invention.

In another document with the publication number EP3062505 B1 in the state of the art, which was validated in Turkey with the application number TR 2018/20863, the camera, posture change detection and posture restoring are not mentioned. A device for detecting a change in posture of a processing part in a camera and a method for restoring posture are disclosed. The device may include a photoelectric deflector structure comprising a photo cutter and a plurality of deflector parts fixed on a base, the deflector parts may include a first deflector part and the remaining second deflector parts having a different length characteristic from the first deflector part, and there is a gap between two adjacent deflector parts. An output signal from the photo cutter changes according to the alignment relationship between the photo cutter and deflector parts. One of the photoelectric deflector structure and the photo cutter can monitor the movement of a processing part of the camera, while the other remains motionless, so that a change of posture of the processing section can be detected depending on the output signal from the photo cutter. However, in said invention, measurement with odometry and augmented reality are not mentioned, and undesired translational position changes cannot be prevented with this invention.

In the prior art publication number U.S. Pat. No. 5,579,071 A, a camera stabilization support is suggested. The camera stabilizer support apparatus includes motorized "XY translation" of one or more components of the camera equipment. Precise position adjustment is possible with an adjustable yaw mechanism that can be isolated from the support arm extending from the operator's body to maintain both dynamic and static balance throughout the range of motion. In addition, centring is provided for the gimbal locking elements so that clamp distortion does not occur.

In the document with the publication number CN113219761 A, a stabilizer with a miniature panoramic camera and the fixation method are mentioned. The stabilizer includes: miniature camera, protective cover, a miniature camera stabilization frame, a miniature camera base, gyroscope sensor, pitching motor, a pitching angle sensor, a pitching drive circuit, turntable motor, a roll angle sensor, turntable drive circuit, a power supply circuit, and a main control circuit. According to the device, the basic positioning of the lens is completed through a series of sensors, such as gyroscope sensor, tilt angle sensor and roll angle sensor, the self-adaptive adjustment of the camera lens is completed by controlling the corresponding servo motor. After the corresponding operating rod or base is adjusted, the stabilizer can make stable compensation in real time during dynamic use. If the mobile platform is unstable during the shooting process, the stability problem of the camera is solved.

Documents such as TR 2014/15549 and U.S. Pat. No. 5,963,749 A can also be examined in order to determine the state of the art, but none of them mention a structure and an operation method thereof, unlike at least one embodiment of the present disclosure.

Conclusively, due to the above described problems and the insufficiency of the existing solutions made it necessary to make an improvement in the relevant technical field.

SUMMARY

Embodiments of the disclosure were created to solve the abovementioned negativities by being inspired by the current situation.

One aim of embodiments of the disclosure is to provide a multi-axis camera stabilization system that ensures that the cameras remain stable during shooting and the operation method thereof.

Another aim of embodiments of the disclosure is to provide a multi-axis camera stabilization system which uses the visual-inertial odometry method and works in integration with augmented reality, which ensures that the cameras remain stable during shooting, and the operation method thereof.

Another aim of embodiments of the disclosure is to provide a multi-axis camera stabilization system that is easy to use and install and the operation method thereof.

Another aim of embodiments of the disclosure is to provide a lightweight multi-axis camera stabilization system.

Another aim of embodiments of the disclosure is to provide a multi-axis camera stabilization system that prevents unwanted translation position changes and operation method thereof.

Another aim of embodiments of the disclosure is to provide a multi-axis camera stabilization system which provides compensation for undesired movements in all axes and the operation method thereof.

Another aim of embodiments of the disclosure is to provide a multi-axis camera stabilization system which can also meet the slow movements that the existing systems cannot meet and the operation method thereof.

Another aim of embodiments of the disclosure is to provide a multi-axis camera stabilization system which can also meet the unwanted position changes on the vertical axis caused by constant (close) frequency repetitive movements such as walking and the operation method thereof.

Another aim of embodiments of the disclosure is to provide a multi-axis camera stabilization system which ensures that the viewer does not feel too much in the process by creating an objective shooting/point of view, and the operation method thereof.

The structural and characteristic properties and all advantages of embodiments of the disclosure will be more clearly understood with the figures given below and the detailed description written with reference to these figures and therefore, the assessment should also be made by taking these figures and the detailed description into account.

DETAILED DESCRIPTION

Description of Part References in the FIGS

1. Arm
2. Camera
3. Mobile Device
4. Mobile Device Software
5. Motor
6. Motor Controller
7. Motor Control Software
8. Connecting Rod-Crank Mechanism
9. Communication Module
10. Communication Protocol In this detailed description, the multi-axis camera stabilization system and the operation method thereof, as well as its preferred embodiments/applications, which are the subject of the disclosure, are explained only for a better understanding of the subject, without any restrictive effect.

Figure 1:
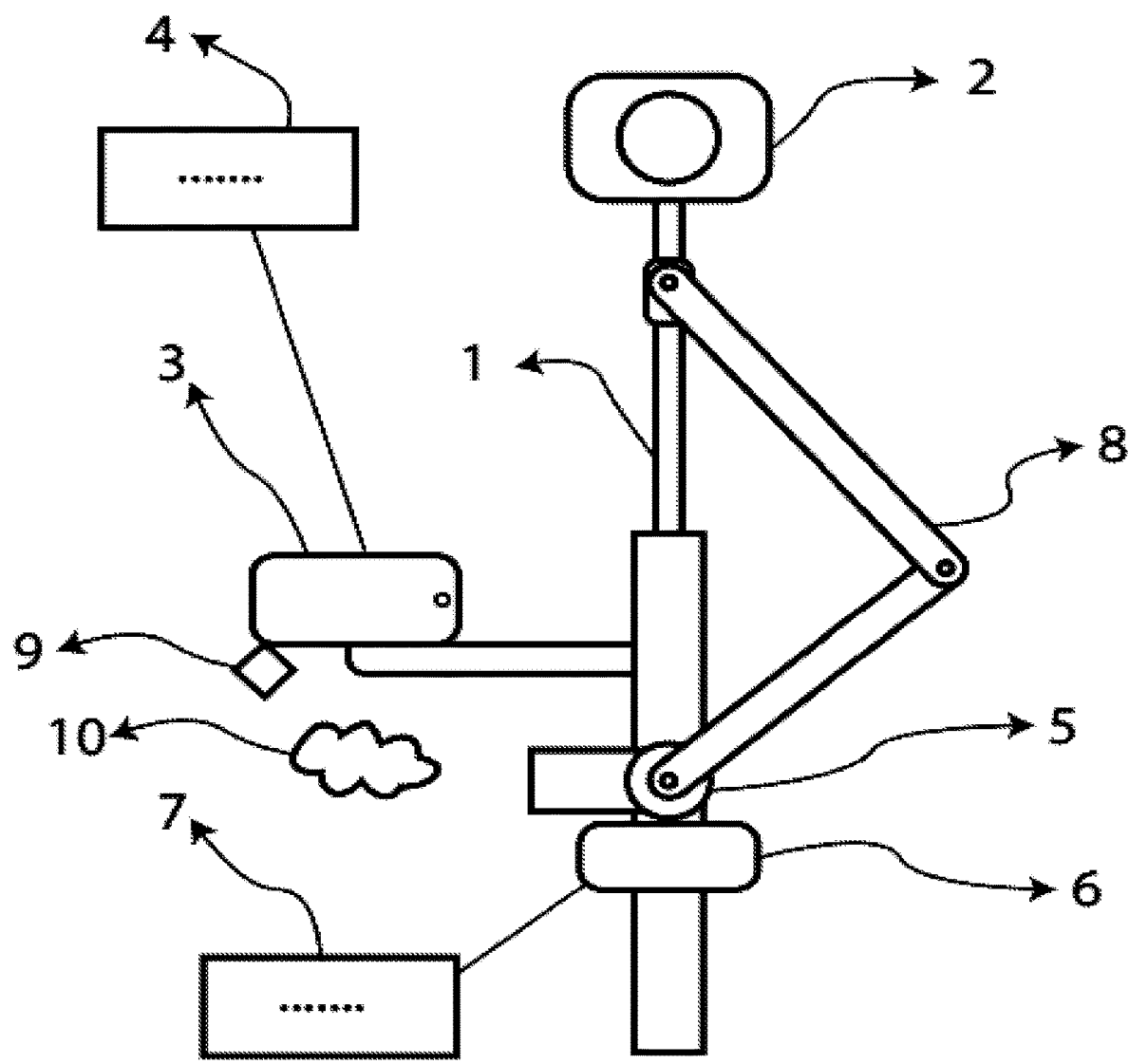
FIG. 1. is the representative view of a multi-axis camera stabilization system, according to at least one embodiment of the disclosure.
Figure 2:
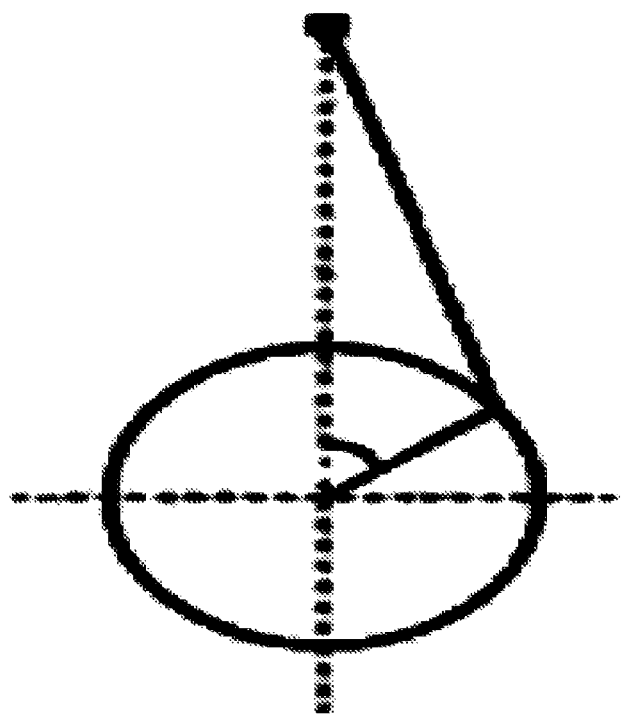
FIG. 2. is the representative view of the movements provided by the motor of the multi-axis camera stabilization system, according to at least one embodiment of the disclosure.

FIG. 1 is the representative view of the multi-axis camera stabilization system that is the subject of the disclosure, which is integrated with augmented reality working with the visual-inertial odometry method, and ensures that the cameras (2) remain stable during shooting.

With the electromechanical mechanism supported by the software proposed in the disclosure, it will be possible for the camera (2) systems operating independently of the ground to keep themselves stable on the vertical axis and to prevent position changes that disturb the viewer.

Although the disclosure is related to camera (2) systems, it can also be used in robotic designs where the position is desired to be kept constant in many military and similar systems.

The multi-axis camera stabilization system includes an arm (1) that enables the operator to hold said camera (2).

Said arm (1) is generally of telescopic structure. By moving its upper part, it tries to balance the unwanted movements of the camera (2), and on the lower part, there is a hand-held, preferably fixed part.

Said arm (1) can be a gimbal that balances the camera (2) on several axes, or it can be an arm (1) apparatus that does not balance on any axis. For example, if it is assumed that the arm (1) is a gimbal and it balances in the forward-backward, right-left and rotation directions, the stabilization system will only balance in the up and down directions. However, if the arm (1) does not have a balancing function in any axis, at least one embodiment of the disclosure can be operated by associating a drive mechanism to each axis and stabilization can be achieved in multiple axes.

The multi-axis camera stabilization system also includes a mobile device (3) located on said arm (1)— preferably on the lower part of the hand-held device, which allows to detect the direction and amount of the operators movements affecting the camera (2), by means of the sensors and image acquisition unit it contains.

Said sensors may be gyroscopes and/or accelerometers in the mobile device (3), for example a mobile phone. In this way, the dependency on an element that will act as a sensor, such as an external gyroscope, is eliminated, thus providing an advantage in terms of both weight and electronic simplicity. Another advantage of this design is the advantage it will bring in terms of cost and therefore product price.

Said mobile device (3) is a mobile device (3) that supports augmented reality applications. In the multi-axis camera stabilization system, there also is a mobile device software (4) that visually analyses the images taken from said mobile device (3), again allows determining the position of the part via which the operator holds the arm (1), the direction it moves and the amount of movement with visual-inertial odometry by comparing the movement direction and amount data received from the mobile device (3).

In order to prevent undesired location changes, first of all, location detection is needed. In detecting the location by the level difference of GPS or Wi-Fi signals, the sensitivity is not high enough to detect the camera (2) movements. Another obstacle in these techniques is that the shots can also take place indoors. Especially GPS systems cannot work efficiently indoors. For this reason, the visual-inertial odometry method is used.

When the position detection chickens make in order to keep their heads stable is examined, it is seen that 3 main human-like elements are used:
1. Visual System: Position estimation based on change in visible image
2. Vestibular System: Detecting acceleration and direction according to the change of fluid in the ear with the middle ear and estimating the position in the light of these data.
3. Somatosensory System: Position estimation with knowledge of muscle and joint movements.

Visual (visual) and vestibular (inertial) systems are the same method as visual-inertial odometry used in augmented reality systems. Said visual-inertial odometry works as follows:

Images taken from the imaging unit of the mobile device (3) are analysed. In addition, sensor data is processed and compared, and odometry is completed with both visual data from the mobile device (3) and inertial data from its sensors. With the sensor fusion resulting from this comparison, the error rate is reduced to extremely low levels.

Said mobile device software (4) is preferably an IOS software written in Xcode, and it receives the generated location information live 60 times per second instantaneously. The received location information is then reversed in the mobile device software (4).

The multi-axis camera stabilization system also includes a motor (5) that enables the said arm (1) and thus the camera (2) to move in at least one axis with which it is associated.

Said motor (5) and mobile device (3) are positioned close to the hand-held lower part of the arm (1) and, Wherein said motor (5) can be mounted on the axes (right-left, forward-backward, up-down) to be balanced, and balancing can be achieved in all axes. Thus, the camera (2) can be kept fixed in all directions, or only in up and down directions, however it is desired. Especially when moving slowly, the viewer can be given the perception of moving on a flat surface.

In a preferred embodiment of the disclosure, said motor (5) is servo-featured.

In the multi-axis camera stabilization system, there also is a motor controller (6) that enables the motor (5) to be controlled according to the position and motion information it receives from said mobile device software (4).

Said motor controller (6) may preferably be a Raspberry-Pi mini computer.

In the multi-axis camera stabilization system, there also is a motor control software (7), which allows the movement information received from said mobile device (3) to be scaled according to the length of the arm (1) and determined the angle of motion of the motor (5), allowing the arm (1) to move in the opposite direction of the motion information received.

Thus, the hand movement of the operator is detected and a movement command in the opposite direction is given and this movement is compensated.

Said motor control software (7) is preferably written in Python.

The multi-axis camera stabilization system also includes a connecting rod-crank mechanism (8) that provides the transfer of motion between said arm (1) and the engine (5).

Position and motion information obtained using visual-inertial odometry method with mobile device (3) and mobile device software (4) is transferred to the arm (1) and thus to the camera (2) through the engine (5), the engine controller (6), the engine control software (7) and the connecting rod-crank mechanism (8). Thus, the movement of the camera (2) in the opposite direction is detected by detecting the movement in any axis from the hand of the operator (cameraman), and unwanted position changes are met. The main configuration of the multi-axis camera stabilization system finally includes a communication module (9) that enables information to be exchanged between said mobile device (3) and the motor controller (6) over a communication protocol (10).

In a preferred embodiment of the disclosure, said communication module (9) is USB Ethernet module.

In a preferred embodiment of the disclosure, said communication protocol (10) is MQTT protocol.

The operation method of the multi-axis camera stabilization system, which ensures that the cameras (2) remain stable during shooting with the visual-inertial odometry method, works as follows:
  detecting the movements of the operator affecting the camera (2), the direction and amount of the movement by means of the sensors in the mobile device (3),
  the mobile device software (4) analysing the images coming from the imaging unit of the mobile device (3) during the motion,
  the mobile device software (4) comparing the images it analysed after they are taken from the imaging unit of the mobile device (3) and the motion data received from the sensors of the mobile device (3), and determining the position of the part where the operator holds arm (1), the direction and the amount of movement,
  the mobile device software (4) reversing the amount of motion detected,
  the mobile device (3) sending the amount of movement and position data reversed by the mobile device software (4) to the motor controller (6) via the communication module (9) working on a communication protocol (10),
  the motor control software (7) scaling the amount of movement information according to the length of the arm (1),
  the motor control software (7) converting the movement amount information it has scaled into an angle to move the arm (1) and thus the camera (2) in at least one axis with which the motor (5) is associated,
  the motor control software (7) moving the motor (5) by the amount of angle determined by the motor driver (6),
  the motor (5) moving the arm (1), on at least one axis with which it is associated and by means of the connecting rod-crank mechanism (8), and thus the camera (2) in the same axis and in the opposite direction as the movement of the operator reflected on the camera (2).

Figure 3:
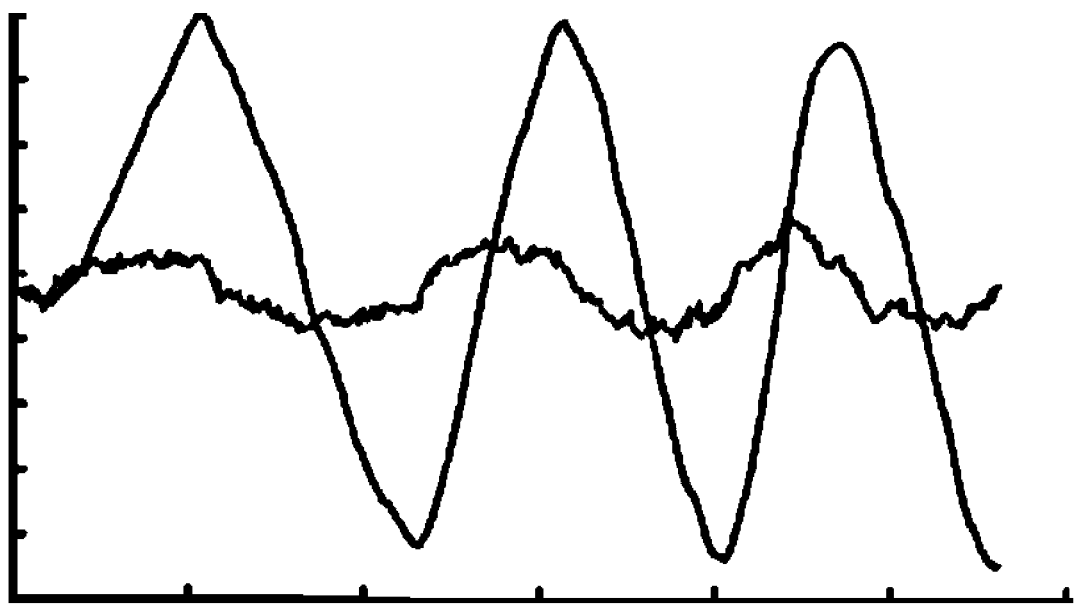
FIG. 3. is the view of the representative graph of the hand position and camera position changes of the multi-axis camera stabilization system, according to at least one embodiment of the disclosure, based on the number of measurements.

The system working with the method of at least one embodiment of the disclosure was produced as a prototype and the test results shown in FIG. 3 were obtained. According to these results, for example, a 163 mm position change of the hand is reflected to the camera (2) as only 16 mm. This shows that unwanted movements are prevented by 90%.

Thus, the multi-axis camera stabilization system, which ensures that the cameras (2) remain stable during shooting with the visual-inertial odometry method, and the operation method thereof are revealed.

The invention claimed is:

1. A multi-axis camera stabilization system, which ensures that a camera remains stable while camera recording by a visual-inertial odometry method, the system comprising:
   at least one arm that enables an operator to hold the camera,
   at least one mobile device located on the at least one arm,
   a mobile device software that visually analyzes images taken from the at least one mobile device, which enables determining a position of a part via which the operator holds the at least one arm, a direction the part moves, and an amount of movement with visual-inertial odometry, by comparing the movement direction and amount data received from the at least one mobile device,
   at least one motor that enables the at least one arm, and thus the camera, to move in at least one axis with which the at least one arm is associated,
   at least one motor controller that enables the at least one motor to be controlled according to the position and movement information received from the mobile device software,
   motor control software, which enables the arm to move in the opposite direction of the incoming movement information by scaling the movement information received from the mobile device according to the length of the arm and determining the angle of movement of the motor,
   at least one connecting rod-crank mechanism, which provides transfer of movement between the at least one arm and the at least one motor, and
   at least one communication module that enables information to be exchanged between the at least one mobile device and the at least one motor controller over a communication protocol.

2. The multi-axis camera stabilization system according to claim 1, wherein the at least one communication module is a USB Ethernet module.

3. The multi-axis camera stabilization system according to Claim 1, wherein the communication protocol is a MQTT protocol.

4. The multi-axis camera stabilization system according to Claim 1, wherein the at least one motor is a servo-motor.

5. The multi-axis camera stabilization system according to Claim 1, wherein the at least one arm is telescopic.

6. The multi-axis camera stabilization system according to claim 1, wherein the at least one arm further comprises:
   the movable upper part that holds the camera and compensates for the undesired movements of the camera, and
   the lower part, which is the hand-held part and where the engine and mobile device are located.

7. An operation method of a multi-axis camera stabilization system, which ensures that a camera remains stable while the camera records by a visual-inertial odometry method, the method comprising:
   detecting, by sensors in a mobile device, movements of an operator affecting the camera, and a direction and an amount of the movements,
   analyzing, by software installed on the mobile device, images taken during the movement,
   comparing, by the mobile device software, the analyzed images and movement data received from the sensors of the mobile device, and determining a position of a part where the operator holds an arm, the direction and the amount of the movements,
   reversing, by the mobile device software, an amount of the movement detected,
   sending, by the mobile device, an amount of movement and position data reversed by the mobile device software to a motor controller via a communication module working on a communication protocol,
   scaling, by motor control software, the amount of movement information according to a length of the arm,
   converting, by the motor control software, the movement amount information scaled into an angle to move the arm and thus the camera in at least one axis with which the motor is associated,
   moving, by the motor control software, the motor by an amount of an angle determined by a motor driver,
   moving, by the motor and a connecting rod-crank mechanism, the arm on at least one axis with which the arm is associated, and thus moving the camera in the at least one axis and in an opposite direction as the movement of the operator reflected on the camera.

* * * * *